US011148723B2

(12) United States Patent
Chung et al.

(10) Patent No.: US 11,148,723 B2
(45) Date of Patent: Oct. 19, 2021

(54) SIDE SILL FOR A VEHICLE

(71) Applicants: HYUNDAI MOTOR COMPANY, Seoul (KR); KIA MOTORS CORPORATION, Seoul (KR); SUNG WOO HITECH CO., LTD., Busan (KR)

(72) Inventors: Hee Seouk Chung, Hwaseong-si (KR); Hyun Sik Kim, Seoul (KR); Deok Hwa Hong, Suwon-si (KR); Se Jin Ko, Anyang-si (KR); Byeong Cheon Lee, Seoul (KR); Sang Eon Park, Busan (KR); Seok Hwan Hwang, Busan (KR)

(73) Assignees: HYUNDAI MOTOR COMPANY, Seoul (KR); KIA MOTORS CORPORATION, Seoul (KR); SUNG WOO HITECH CO., LTD., Busan (KR)

(*) Notice: Subject to any disclaimer, the term of this patent is extended or adjusted under 35 U.S.C. 154(b) by 149 days.

(21) Appl. No.: 16/653,347

(22) Filed: Oct. 15, 2019

(65) Prior Publication Data
US 2020/0406982 A1    Dec. 31, 2020

(30) Foreign Application Priority Data

Jun. 28, 2019   (KR) .................. 10-2019-0077579

(51) Int. Cl.
| | | |
|---|---|---|
| B62D 25/20 | (2006.01) | |
| B62D 25/02 | (2006.01) | |
| B62D 27/02 | (2006.01) | |
| B62D 21/09 | (2006.01) | |

(52) U.S. Cl.
CPC .......... B62D 25/025 (2013.01); B62D 21/09 (2013.01); B62D 25/2036 (2013.01); B62D 27/023 (2013.01)

(58) Field of Classification Search
CPC ............ F16B 19/1072; B62D 25/2036; B62D 25/025; B62D 29/008; B62D 27/023; B60K 1/04; B60K 2001/0438; B60K 2001/0472
USPC ...................... 296/209; 180/68.5; 411/34, 55
See application file for complete search history.

(56) References Cited

U.S. PATENT DOCUMENTS

| | | | | |
|---|---|---|---|---|
| 5,624,130 A | * | 4/1997 | Ricks | ................. B60R 21/2035 24/453 |
| 6,776,566 B2 | * | 8/2004 | Kobusch | ............... F16B 5/0283 411/432 |
| 7,241,097 B2 | * | 7/2007 | Dembowsky | ......... F16B 5/0233 411/34 |
| 10,167,019 B2 | | 1/2019 | Ayuzawa | |
| 10,780,767 B2 | * | 9/2020 | Rawlinson | .............. B60L 50/66 |

(Continued)

FOREIGN PATENT DOCUMENTS

| | | |
|---|---|---|
| JP | 2006168594 A | 6/2006 |
| JP | 2008207772 A | 9/2008 |

(Continued)

Primary Examiner — Dennis H Pedder
(74) Attorney, Agent, or Firm — Lempia Summerfield Katz LLC

(57) ABSTRACT

A side sill for a vehicle includes: an inner portion facing an interior space of the vehicle; an outer portion facing an exterior space of the vehicle; and mounting hardware, which is riveted to one of the inner portion and the outer portion, wherein the inner portion and the outer portion form a unitary one-piece structure.

11 Claims, 8 Drawing Sheets

(56) References Cited

U.S. PATENT DOCUMENTS

| | | | |
|---|---|---|---|
| 2012/0210557 A1* | 8/2012 | Jones | B21J 15/365 29/525.06 |
| 2016/0010679 A1* | 1/2016 | Makino | F16B 37/067 411/34 |
| 2017/0267290 A1 | 9/2017 | Ayuzawa | |

FOREIGN PATENT DOCUMENTS

| | | |
|---|---|---|
| JP | 6150365 B2 | 6/2017 |
| JP | 2017196943 A | 11/2017 |
| KR | 20120012655 A | 2/2012 |

\* cited by examiner

SIDE SILL FOR A VEHICLE

CROSS-REFERENCE TO RELATED APPLICATION

This application is based on and claims the benefit of priority to Korean Patent Application No. 10-2019-0077579, filed on Jun. 28, 2019, in the Korean Intellectual Property Office, the disclosure of which is incorporated herein in its entirety by reference.

TECHNICAL FIELD

The present disclosure relates to a side sill for a vehicle, and more particularly, to a side sill for a vehicle allowing an inner portion and an outer portion to form a unitary one-piece structure to thereby reduce material cost and the weight of a vehicle body, and uniformly distributing a mounting load of mounting hardware to thereby provide improved mounting of a battery assembly.

BACKGROUND

A vehicle includes a pair of side sills disposed on the left and right sides of a floor.

A front end of each side sill may be coupled to a rear end of a front side member, and a rear end thereof may be coupled to a front end of a rear side member. The side sills serve to protect a passenger compartment from side collisions and frontal collisions of the vehicle.

Each side sill may have an inner side sill coupled to the edge of the floor, an outer side sill facing the outside of the vehicle, and a plurality of reinforcing members interposed between the inner side sill and the outer side sill. The inner side sill and the outer side sill may be coupled by welding, using fasteners, and/or the like. The plurality of reinforcing members may include an extruded product extending in a longitudinal direction of a vehicle body, a plurality of brackets and mounting hardware for fixing the extruded product, and a plurality of auxiliary members for reinforcing stiffness.

An electric vehicle has a battery assembly, which is assembled to the bottom of a floor of a vehicle body. The battery assembly may be coupled using a plurality of bolts individually coupled to the plurality of mounting hardware. The mounting hardware may be coupled to top and bottom ends of the bracket by $CO_2$ welding and/or the like, respectively.

The existing side sill may have a complex coupling structure. This is because individually manufactured inner and outer side sills are coupled by welding, using fasteners, and/or the like, and the plurality of reinforcing members are coupled using fasteners, $CO_2$ welding, and/or the like. As a result, the material cost may be relatively increased and it may be difficult to reduce the weight of the vehicle body. In addition, the mount stiffness may be relatively reduced. As the $CO_2$ welding is applied, it may cause a $CO_2$ welding quality problem.

The above information described in this background section is provided to assist in understanding the background of the inventive concept. The background section may include a technical concept, which is not considered as prior art that is already known to those having ordinary skill in the art.

SUMMARY

The present disclosure has been made to solve the above-mentioned problems occurring in the prior art while advantages achieved by the prior art are maintained intact.

An aspect of the present disclosure provides a side sill for a vehicle. The side sill allows an inner portion and an outer portion to form a unitary one-piece structure to thereby reduce material cost and decrease the weight of a vehicle body. The side sill uniformly distributes a mounting load of mounting hardware to thereby provide improved mounting of a battery assembly.

According to an aspect of the present disclosure, a side sill for a vehicle may include: an inner portion facing an interior space of the vehicle; an outer portion facing an exterior space of the vehicle; and mounting hardware, which is riveted to one of the inner portion and the outer portion. The inner portion and the outer portion may form a unitary one-piece structure.

The mounting hardware may be riveted to the inner portion.

The side sill may further include a horizontal mounting rib extending horizontally in an interior space between the inner portion and the outer portion. The horizontal mounting rib may be spaced apart from a bottom wall of the inner portion and the mounting hardware may pass through the bottom wall of the inner portion and the horizontal mounting rib.

The bottom wall of the inner portion may be thicker than a remaining portion of the inner portion.

The mounting hardware may include a first cylindrical portion, a second cylindrical portion extending upwardly from a top end of the first cylindrical portion, a third cylindrical portion extending upwardly from a top end of the second cylindrical portion, and a head portion disposed on a bottom end of the first cylindrical portion. The first cylindrical portion may have an outer diameter greater than an outer diameter of the second cylindrical portion and an outer diameter of the third cylindrical portion. The bottom wall of the inner portion may have a first mounting hole in which the first cylindrical portion is received. The horizontal mounting rib may have a second mounting hole in which the second cylindrical portion is received.

The second cylindrical portion may be deformed outwardly when an axial force is applied to the mounting hardware.

When an axial force is applied to the mounting hardware, the second cylindrical portion may be expanded or bulged outwardly so that the second cylindrical portion may be deformed into a bulged portion. The bulged portion may have an outer diameter greater than a diameter of the second mounting hole. The horizontal mounting rib may press the bulged portion upwardly and the head portion may press the bottom wall upwardly.

The second cylindrical portion may be thinner than the first cylindrical portion and the third cylindrical portion.

The second cylindrical portion may have a plurality of grooves extending longitudinally in an outer surface thereof.

The third cylindrical portion may have an internal thread on an inner surface thereof.

The side sill may further include a reinforcing rib, which is orthogonal to the horizontal mounting rib. The reinforcing rib may extend from the bottom wall of the inner portion to a top wall of the inner portion.

The head portion may have a plurality of projections and each projection may have a sharp edge on a top end thereof.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
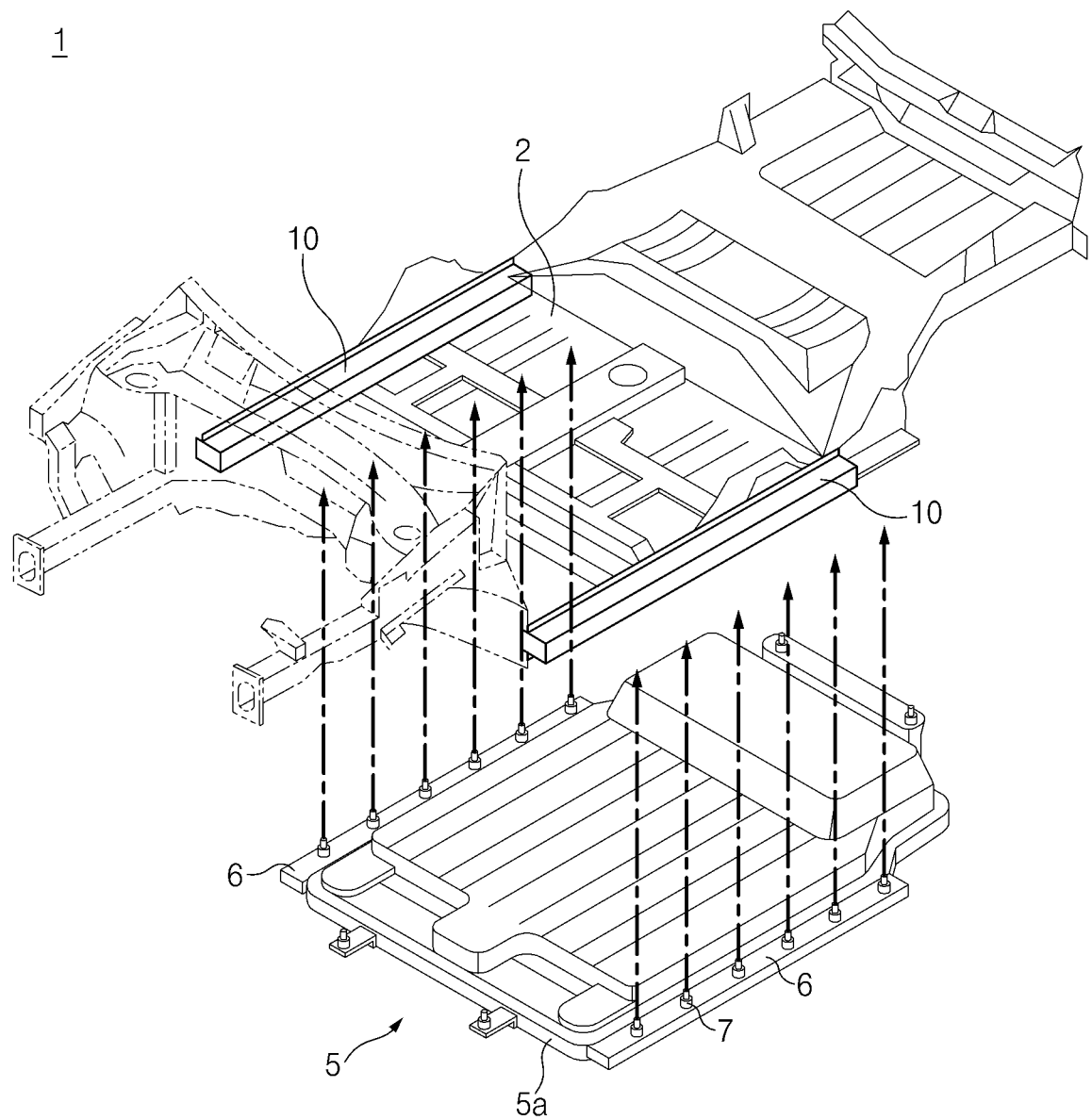
FIG. 1 illustrates a perspective view of a floor structure of a vehicle body.

Hereinafter, embodiments of the present disclosure are described in detail with reference to the accompanying drawings. In the drawings, the same reference numerals are used throughout to designate the same or equivalent elements. In addition, a detailed description of well-known techniques associated with the present disclosure has been omitted in order not to unnecessarily obscure the gist of the present disclosure.

Terms such as first, second, A, B, (a), and (b) may be used to describe the elements in embodiments of the present disclosure. These terms are only used to distinguish one element from another element. The intrinsic features, sequence or order, and the like of the corresponding elements are not limited by such terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

Referring to FIG. 1, a floor structure of a vehicle body 1 may include a floor panel 2, a pair of side sills 10 coupled to both sides of the floor panel 2, and a battery assembly 5 assembled to the bottom of the floor panel 2.

Figure 2:
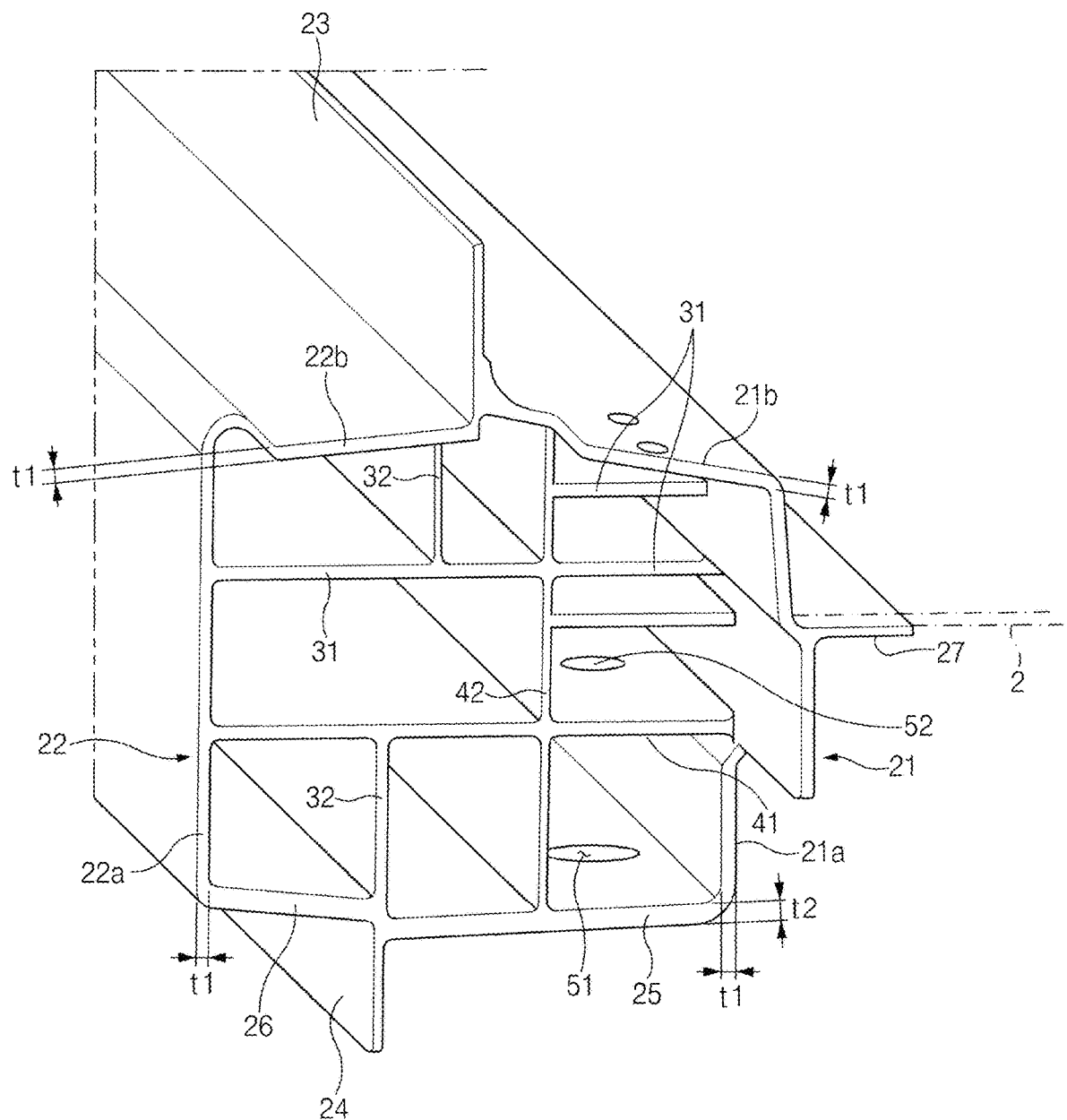
FIG. 2 illustrates a perspective view of a side sill for a vehicle according to an embodiment of the present disclosure.

Referring to FIG. 2, each side sill 10 may extend in a longitudinal direction of the vehicle body 1. Each side sill 10 may include an inner portion 21 facing an interior space of the vehicle and an outer portion 22 facing an exterior space of the vehicle.

The inner portion 21 may have a C-shaped cross-section. The inner portion 21 may have a side wall 21a, a top wall 21b connected to a top end of the side wall 21a, and a bottom wall 25 connected to a bottom end of the side wall 21a.

The outer portion 22 may have a C-shaped cross-section. The outer portion 22 may have a side wall 22a, a top wall 22b connected to a top end of the side wall 22a, and a bottom wall 26 connected to a bottom end of the side wall 22a.

Each side sill 10 may have a closed cross-section defined by the inner portion 21 and the outer portion 22. In an embodiment, the side sill 10 may have a plurality of inner ribs 31 and 32. The plurality of inner ribs 31 and 32 may be disposed in an interior space between the inner portion 21 and the outer portion 22. The plurality of inner ribs 31 and 32 may extend in a longitudinal direction of the side sill 10. The plurality of inner ribs 31 and 32 may strengthen, i.e., increase the stiffness of the side sill 10, so that an impact load generated in a side collision of the vehicle may be uniformly distributed through the plurality of inner ribs 31 and 32. According to an embodiment, the plurality of inner ribs 31 and 32 may include one or more horizontal ribs 31 that extend horizontally and may include one or more vertical ribs 32 that extend vertically, as illustrated in FIG. 2.

The side sill 10 may have a top flange 23 formed on a top end thereof. The top flange 23 may be located between a top end of the inner portion 21 and a top end of the outer portion 22.

The side sill 20 may have a bottom flange 24 formed on a bottom end thereof. The bottom flange 24 may be located between a bottom end of the inner portion 21 and a bottom end of the outer portion 22.

The inner portion 21 may have a matching flange 27, which is matched to the floor panel 2 of the vehicle body 1. The matching flange 27 of the inner portion 21 may be coupled to the floor panel 2 by welding and/or using fasteners. In an embodiment, the matching flange 27 may extend horizontally to match and couple with the floor panel 2 so that the matching flange 27 of the inner portion 21 may be firmly coupled to the floor panel 2 of the vehicle body 1.

The battery assembly 5 may be mounted to the side sills 10 and the floor panel 2, as shown in FIG. 1. The battery assembly 5 may include one or more battery cells (or a battery module), electrical components associated with the battery cells, a battery housing 5a in which the battery cells and the electrical components are mounted, and a pair of side mounts 6 provided on both sides of the battery housing 5a, respectively. The side mounts 6 of the battery assembly 5 may be mounted to the side sills 10 by a plurality of mounting bolts 7 and a plurality of mounting hardware 60, respectively. The plurality of mounting hardware 60 may be mounted in any one of the inner portion 21 or the outer portion 22 of the side sill 10. The plurality of mounting bolts 7 may be fastened to the plurality of mounting hardware 60, respectively, so that the sides of the battery assembly 5 may be mounted to the side sills 10, respectively.

According to an embodiment, the mounting hardware 60 may be riveted to any one of the inner portion 21 or the outer portion 22 of the side sill 10.

Specifically, the mounting hardware 60 may be riveted to the inner portion 21 of the side sill 10 in a manner that locates the battery assembly 5 under the floor panel 2 of the vehicle body.

Figure 3:
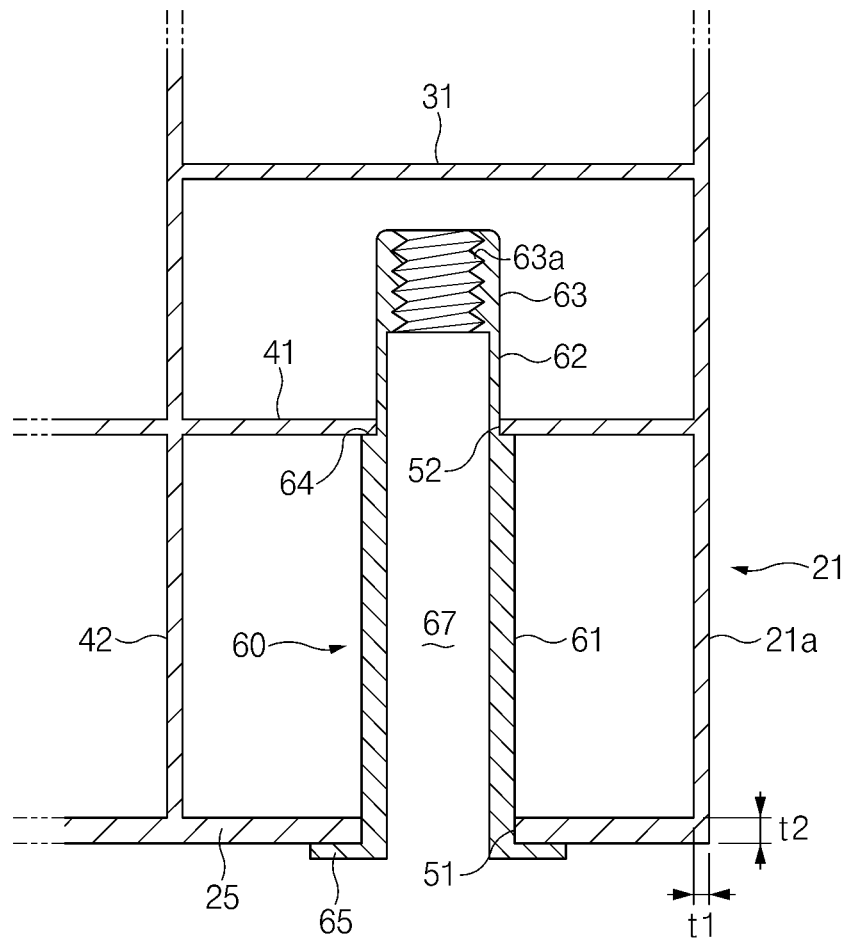
FIG. 3 illustrates a cross-sectional view of a state in which mounting hardware is inserted into an inner portion of a side sill for a vehicle according to an embodiment of the present disclosure.

Referring to FIG. 3, the mounting hardware 60 may include: a first cylindrical portion 61; a second cylindrical portion 62 extending upwardly from a top end of the first cylindrical portion 61; a third cylindrical portion 63 extending upwardly from a top end of the second cylindrical portion 62; and a head portion 65 formed on a bottom end of the first cylindrical portion 61.

The mounting hardware 60 may have a cavity 67 through which the mounting bolt 7 passes. The cavity 67 may extend along the first cylindrical portion 61, the second cylindrical portion 62, and the third cylindrical portion 63.

The first cylindrical portion 61 may extend in a height direction of the side sill 10 and may have stiffness and/or strength enough not to be deformed by a force applied in an axial direction of the mounting hardware 60. For example, the first cylindrical portion 61 may be thicker than the second cylindrical portion 62.

Figure 4:
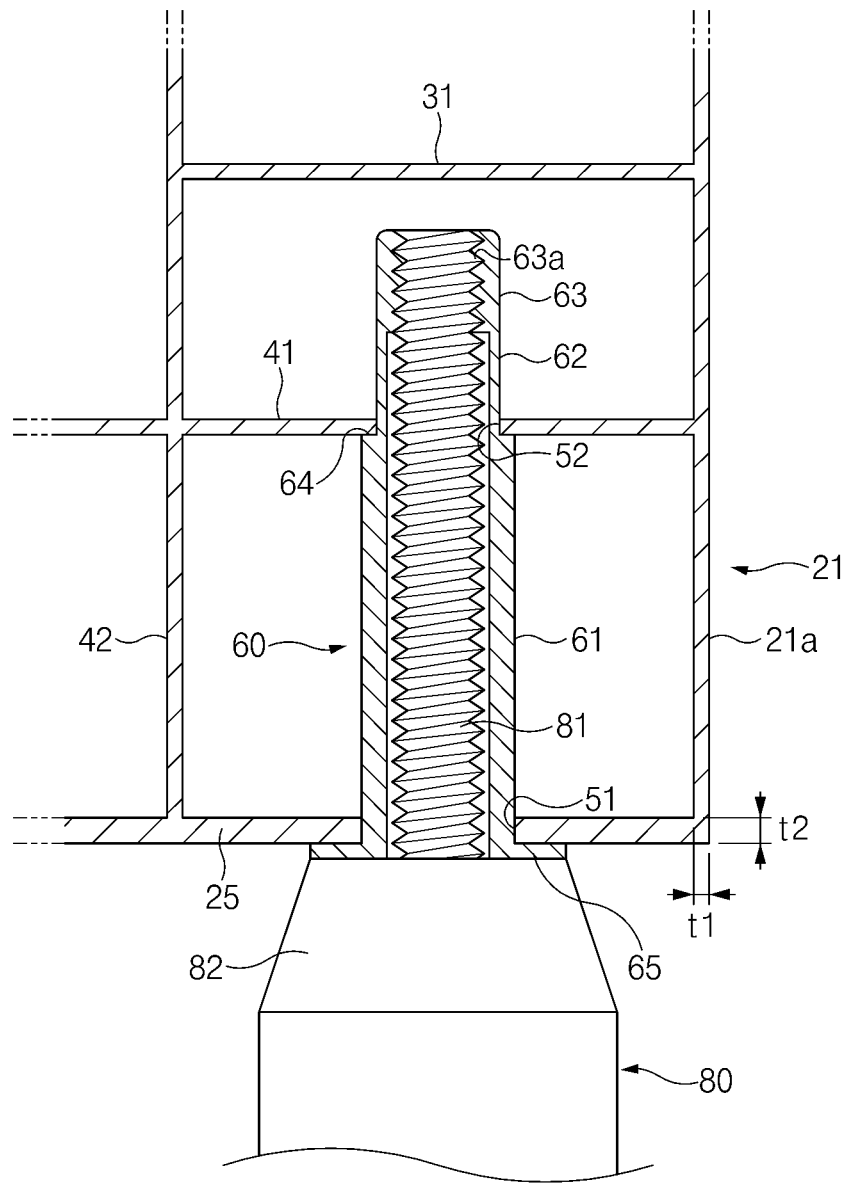
FIG. 4 illustrates a state in which a drift and an anvil of a nut riveter are set in the mounting hardware inserted into the inner portion of the side sill illustrated in FIG. 3.
Figure 5:
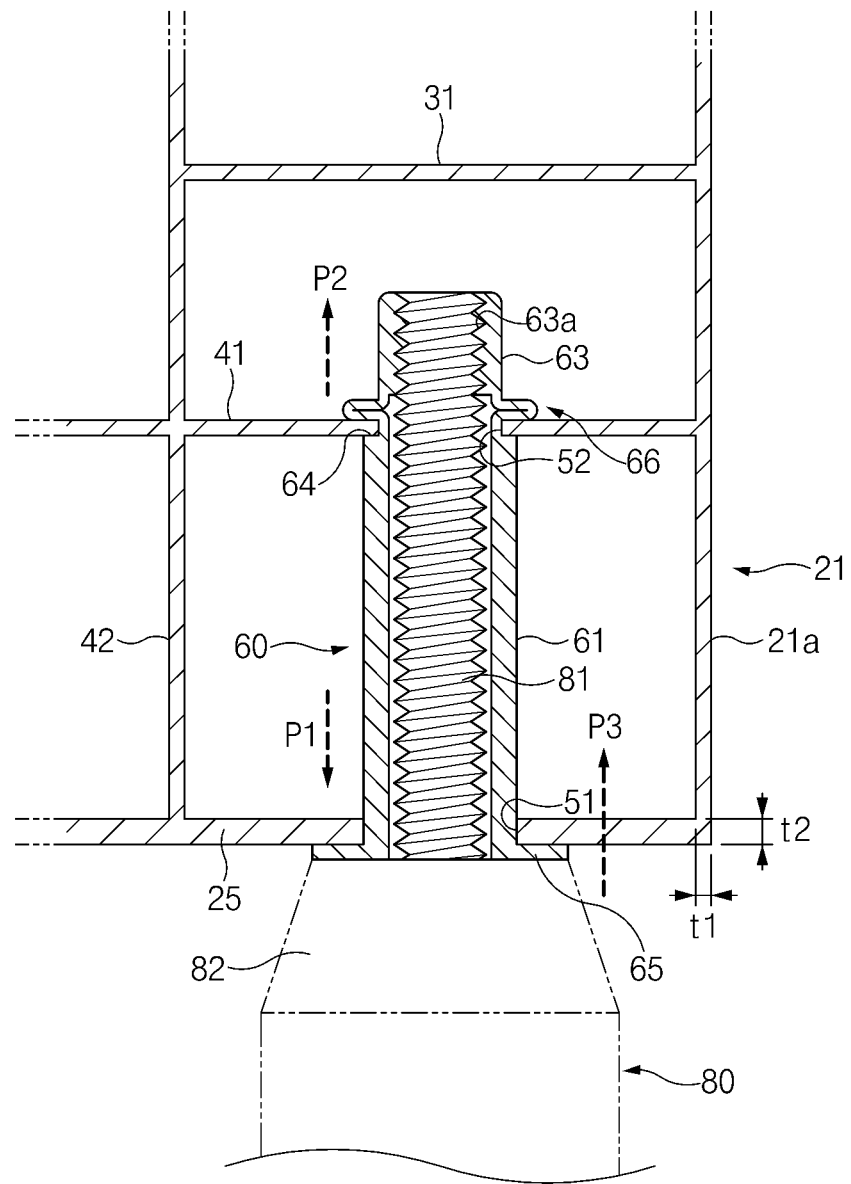
FIG. 5 illustrates a state in which a second cylindrical portion of the mounting hardware in FIG. 4 is deformed as the drift of the nut riveter operates.

The second cylindrical portion 62 may be thinner than the first cylindrical portion 61 and the third cylindrical portion 63. Thus, the second cylindrical portion 62 may be easily expanded (deformed) outwardly by the force applied in the axial direction of the mounting hardware 60. Specifically, as the force is applied in the axial direction of the mounting hardware 60, the second cylindrical portion 62 may be expanded or bulged in an outer diameter direction. Thus, the second cylindrical portion 62 may be deformed into a bulged portion 66 as illustrated in FIGS. 4 and 5.

Figure 7:
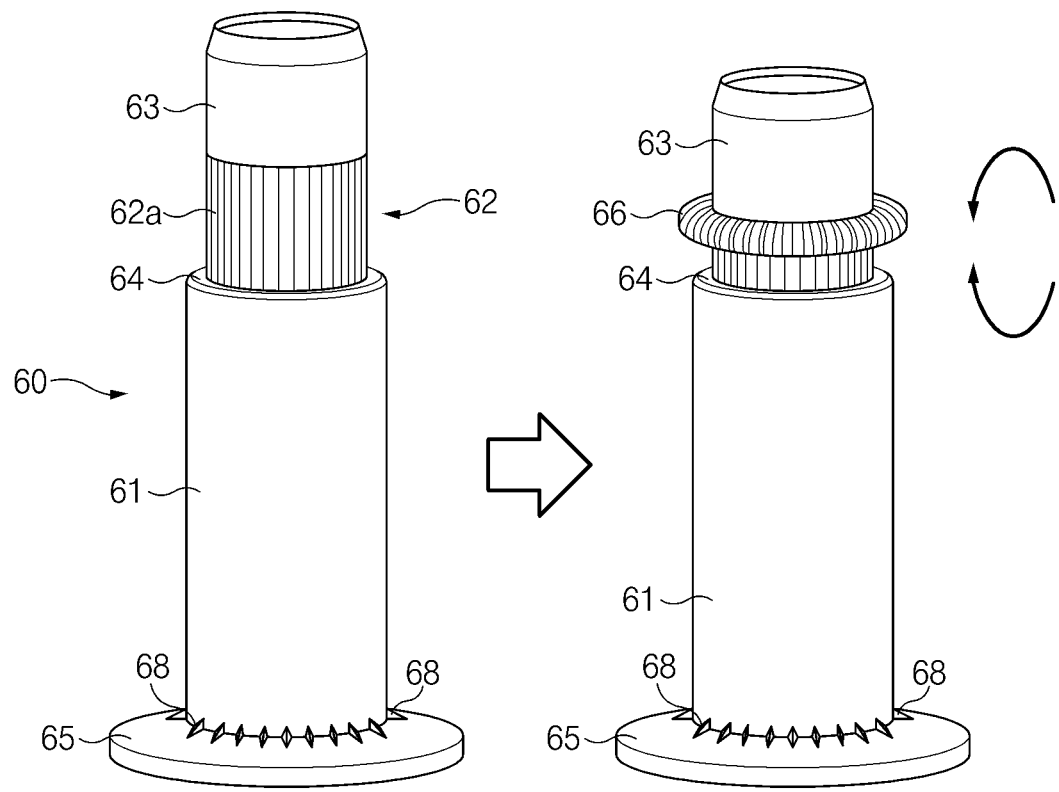
FIG. 7 illustrates a state of the mounting hardware before and after being deformed.

Referring to FIG. 7, the second cylindrical portion 62 may have a plurality of grooves 62a or a plurality of teeth extending longitudinally in an outer surface thereof. The plurality of grooves 62a may be spaced apart from each other in a circumferential direction. As an axial force is applied to the mounting hardware 60, the second cylindrical portion 62 may be more easily deformed outwardly by the plurality of grooves 62a.

The third cylindrical portion 63 may have an internal thread 63a formed on an inner surface thereof. An external thread of the mounting bolt 7 may be engaged to the internal thread 63a of the third cylindrical portion 63. In other words, the third cylindrical portion 63 may function as a nut with respect to the mounting bolt 7. An outer diameter of the second cylindrical portion 62 and an outer diameter of the third cylindrical portion 63 may be smaller than an outer diameter of the first cylindrical portion 61. A retention shoulder 64 may be provided between the second cylindrical portion 62 and the first cylindrical portion 61.

The head portion 65 may be formed on the bottom end of the first cylindrical portion 61 of the mounting hardware 60. An outer diameter of the head portion 65 may be greater than the outer diameter of the first cylindrical portion 61.

The side sill 10 may further include a horizontal mounting rib 41 extending horizontally in the inside thereof. The horizontal mounting rib 41 may be spaced apart from the bottom walls 25 and 26 of the side sill 10. The horizontal mounting rib 41 may extend horizontally to connect the side wall 21a of the inner portion 21 and the side wall 22a of the outer portion 22 so that it may be parallel to the horizontal rib 31. The mounting hardware 60 may pass through the bottom wall 25 of the inner portion 21 and the horizontal mounting rib 41 so that the mounting hardware may be mounted in the interior space of the inner portion 21.

The bottom wall 25 of the inner portion 21 may have a first mounting hole 51 in which the first cylindrical portion 61 of the mounting hardware 60 is received. The horizontal mounting rib 41 may have a second mounting hole 52 in which the second cylindrical portion 62 of the mounting hardware 60 is received. Referring to FIG. 3, as the second cylindrical portion 62 is received in the second mounting hole 52, the retention shoulder 64 may be brought into contact with and support a bottom surface of the horizontal mounting rib 41. As such, the mounting hardware 60 may extend vertically through the first mounting hole 51 of the bottom wall 25 and the second mounting hole 52 of the horizontal mounting rib 41.

A reinforcing rib 42 may extend vertically inside the inner portion 21. The reinforcing rib 42 may be connected to the horizontal mounting rib 41 to be orthogonal to the horizontal mounting rib 41. In an embodiment, the reinforcing rib 42 may be disposed adjacent to the first mounting hole 51 and the second mounting hole 52, thereby reinforcing support stiffness of the bottom wall 25. The reinforcing rib 42 may extend from the bottom wall of the side sill 10 to the top wall thereof. Referring to FIG. 2, the reinforcing rib 42 may extend from the bottom wall 25 of the inner portion 21 to the top wall 21b of the inner portion 21.

According to an embodiment, the bottom wall 25 of the inner portion 21 may support the head portion 65 of the mounting hardware 60. The bottom wall 25 of the inner portion 21 may have a thickness t2 greater than a thickness t1 of the remaining portion (e.g., the side wall 21a and the top wall 21b) of the inner portion 21 and a thickness t1 of the remaining portion (e.g., the side wall 22a and the top wall 22b) of the outer portion 22. Thus, mount stiffness and/or mount strength for the mounting structure of the mounting hardware 60 may be enhanced.

According to an embodiment of the present disclosure, the side sill 10 may be an extruded product which is extruded in the longitudinal direction of the vehicle. The inner portion 21, the outer portion 22, the top flange 23, the bottom flange 24, the plurality of inner ribs 31 and 32, and the plurality of mounting ribs 41 and 42 may form a unitary one-piece structure.

FIGS. 3-6 illustrate a process of mounting the mounting hardware 60 in the side sill 10.

Referring to FIG. 3, the mounting hardware 60 may be inserted into the inner portion 21 so that the first cylindrical portion 61 may be received in the first mounting hole 51 and the second cylindrical portion 62 may be received in the second mounting hole 52.

Referring to FIG. 4, a drift 81 of a nut riveter 80 may pass through the cavity 67 of the mounting hardware 60. An external thread of the drift 81 may be screwed into the internal thread 63a of the third cylindrical portion 63. An anvil 82 of the nut riveter 80 may press or support the head portion 65 of the mounting hardware 60 upwardly, so that the head portion 65 of the mounting hardware 60 may be held down by the anvil 82 of the nut riveter 80.

Referring to FIG. 5, when the drift 81 is moved downwardly by the operation of the nut riveter 80, the drift 81 may pull the third cylindrical portion 63 of the mounting hardware 60 toward the anvil 82. In other words, as the third cylindrical portion 63 of the mounting hardware 60 is pulled toward the anvil 82 by the nut riveter 80, a first force P1 may be applied downwardly in the axial direction of the mounting hardware 60. As the second cylindrical portion 62 received in the second mounting hole 52 is expanded or bulged by the first force P1 in the outer diameter direction, the second cylindrical portion 62 may be deformed into the bulged portion 66.

Figure 6:
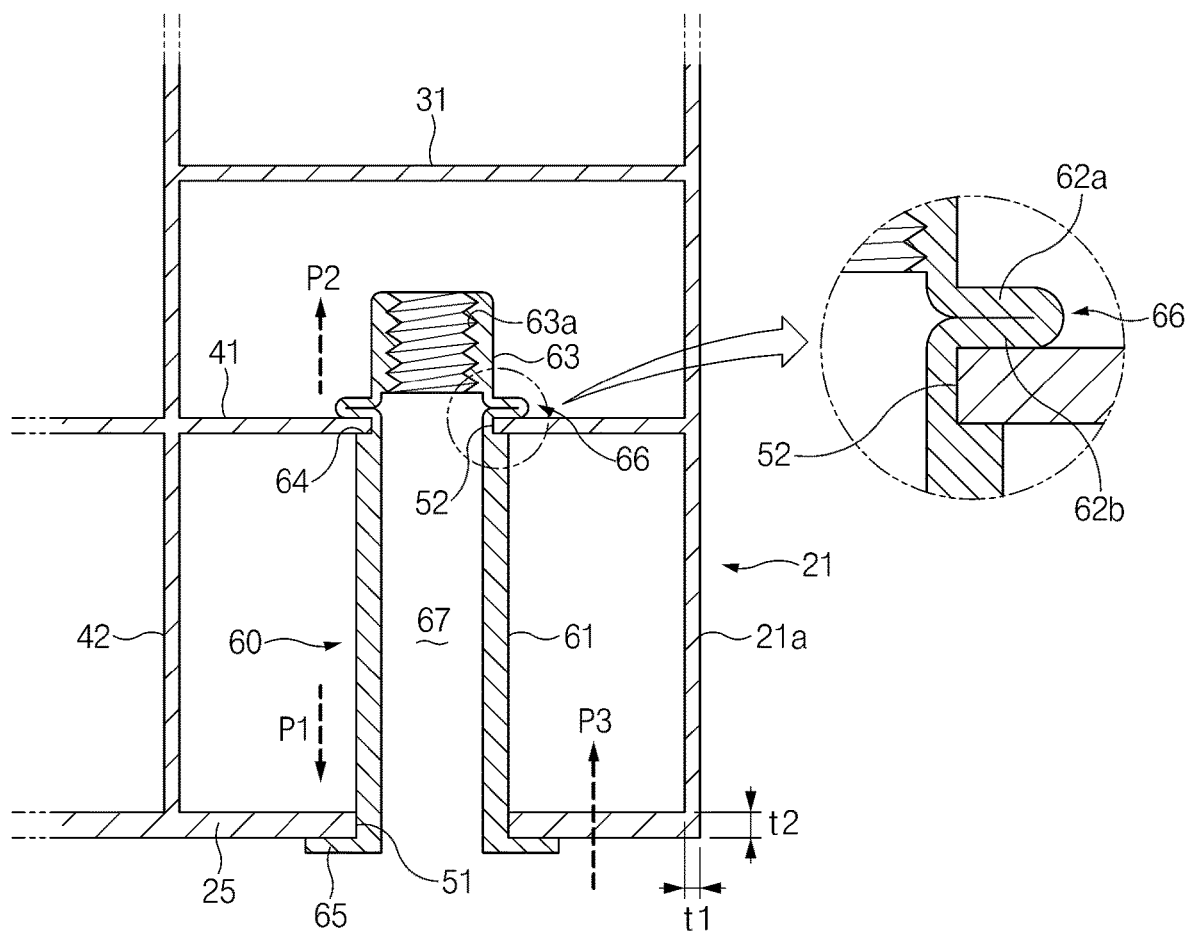
FIG. 6 illustrates a state in which the mounting hardware is riveted to the inner portion of the side sill after the nut riveter in FIG. 5 is removed.

Referring to FIGS. 5 and 6, an upper portion 62a and a lower portion 62b of the second cylindrical portion 62 may overlap to form the bulged portion 66. The bulged portion 66 may be greater than a diameter of the second mounting hole 52. As a bottom surface of the bulged portion 66 tightly contacts a top surface of the horizontal mounting rib 41, a second force P2, which forces the horizontal mounting rib 41 to push the bulged portion 66 upwardly, may be applied in the axial direction of the mounting hardware 60. In other words, as the bulged portion 66 may press the horizontal mounting rib 41, the horizontal mounting rib 41 may press the bulged portion 66 upwardly by reaction force. As the second force P2 is applied between the bottom wall 25 of the inner portion 21 and the horizontal mounting rib 41, a third force P3, which forces the head portion 65 of the mounting hardware 60 to push the bottom wall 25 upwardly, may be applied. In other words, the head portion 65 may press the bottom wall 25 upwardly. Thus, a mounting load of the mounting hardware 60 may be uniformly distributed so that the mount stiffness and/or mount strength thereof may be enhanced.

FIG. 7 illustrates a state of the mounting hardware 60 before and after being deformed. Referring to FIG. 7, the head portion 65 of the mounting hardware 60 may have a plurality of projections 68. The plurality of projections 68 may be spaced apart from each other in the circumferential direction. Each projection 68 may have a sharp edge on a top end thereof. The side sill 10 may be made of a soft material having a relatively low hardness, such as aluminum, and the mounting hardware 60 may be made of a hard material having a relatively high hardness, such as steel. When the head portion 65 of the mounting hardware 60 presses the bottom wall 25 of the side sill 10 upwardly, the plurality of projections 68 may be forcedly embedded in the bottom wall 25 of the side sill 10 due to the hardness difference between the mounting hardware 60 and the side sill 10. Thus, the head portion 65 of the mounting hardware 60 may be firmly fixed to the bottom wall 25 of the side sill 10. When the mounting bolt 7 is fastened, the plurality of projections 68 may prevent the head portion 65 of the mounting hardware 60 from slipping in a rotational direction of the mounting bolt 7 on the bottom wall 25 of the side sill 10.

Figure 8:
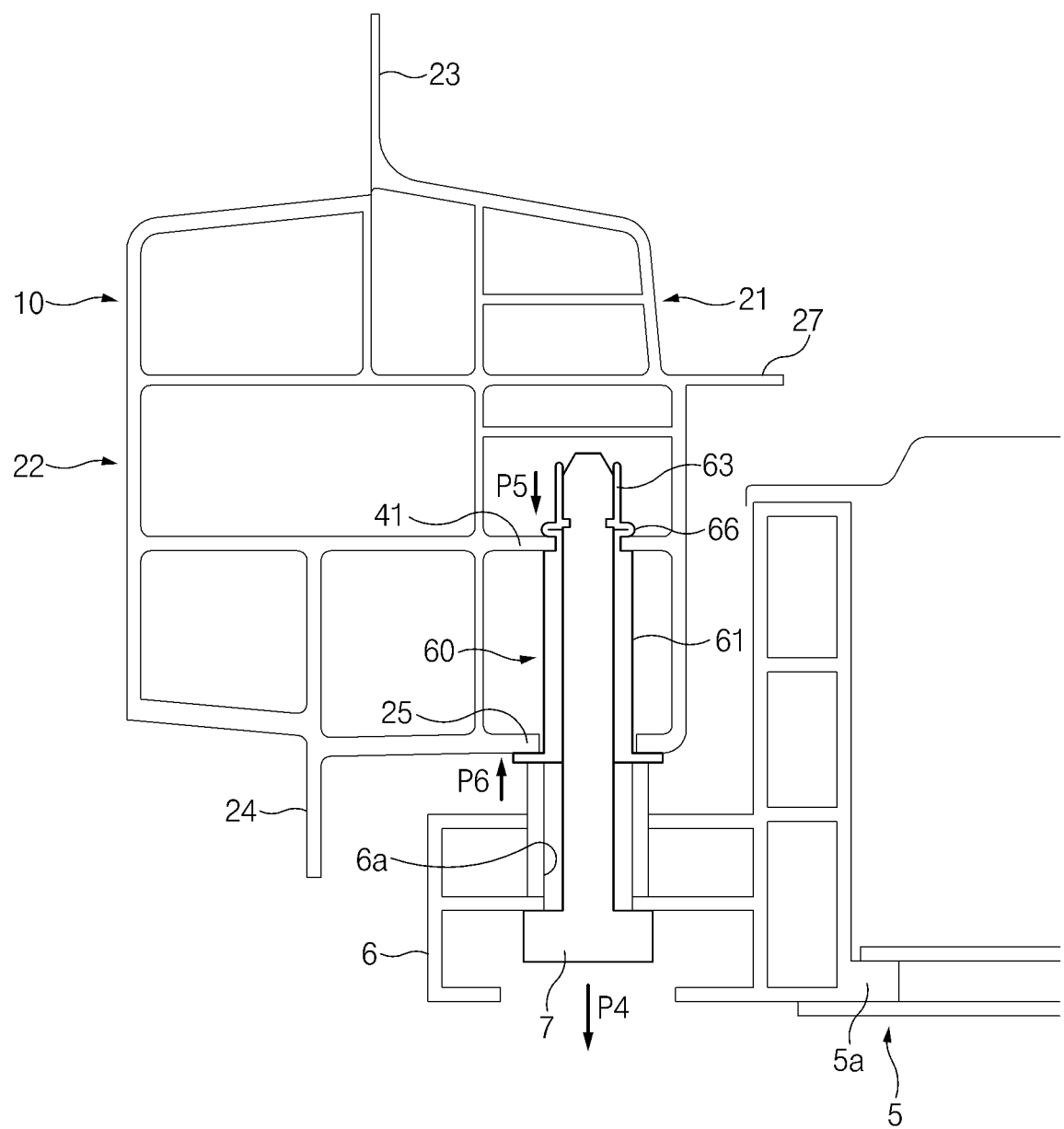
FIG. 8 illustrates a cross-sectional view of a structure in which a battery assembly is mounted to a side sill for a vehicle according to an embodiment of the present disclosure.

Referring to FIG. 8, each side mount 6 of the battery assembly 5 may protrude toward the corresponding side sill 10. The side mount 6 may have a through hole 6a through which the mounting bolt 7 passes. The mounting bolt 7 may pass through the through hole 6a of the side mount 6 and the cavity 67 of the mounting hardware 60. A top end of the mounting bolt 7 may be engaged to the internal thread 63a of the third cylindrical portion 63 of the mounting hardware 60.

As the mounting bolt 7 is engaged to the internal thread 63a of the third cylindrical portion 63 of the mounting hardware 60, a fourth load P4 may be applied downwardly in the axial direction of the mounting hardware 60. Accordingly, a fifth load P5, which forces the bulged portion 66 of the mounting hardware 60 to push the horizontal mounting rib 41 downwardly, may be applied downwardly in the axial direction of the mounting hardware 60. A sixth load P6, which forces the head portion 65 of the mounting hardware 60 to push the bottom wall 25 of the inner portion 21, may be applied upwardly in the axial direction of the mounting hardware 60. Thus, the mounting load of the battery assembly 5 may be uniformly distributed and the mount stiffness and/or mount strength for the mounting structure of the mounting hardware 60 and the battery assembly 5 may be enhanced.

According to embodiments of the present disclosure, the inner portion 21 and the outer portion 22 may form a unitary one-piece structure, thereby reducing the material cost and the weight of the vehicle body. In addition, the mounting load of the mounting hardware may be uniformly distributed, thereby providing the improved mounting of the battery assembly.

In addition, according to embodiments of the present disclosure, as the mounting hardware 60 is riveted to the inner portion 21 of the side sill 10, $CO_2$ welding may be removed. Thus, durability may be increased, and noise created while driving the vehicle or when opening/closing the doors of the vehicle may be reduced.

As set forth above, the side sill for a vehicle, according to embodiments of the present disclosure, may allow the inner portion and the outer portion to form a unitary one-piece structure to thereby reduce the material cost and the weight of the vehicle body. The side sill also may uniformly distribute the mounting load of the mounting hardware to thereby provide the improved mounting of the battery assembly.

Hereinabove, although the present disclosure has been described with reference to specific embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. A side sill for a vehicle, the side sill comprising:
an inner portion facing an interior space of the vehicle;
an outer portion facing an exterior space of the vehicle;
a horizontal mounting rib extending horizontally in an interior space between the inner portion and the outer portion; and
a mounting hardware passing through a bottom wall of the inner portion and the horizontal mounting rib,
wherein the mounting hardware includes a first cylindrical portion, a second cylindrical portion extending upwardly from a top end of the first cylindrical portion, a third cylindrical portion extending upwardly from a top end of the second cylindrical portion, and a head portion disposed on a bottom end of the first cylindrical portion,
wherein the first cylindrical portion has an outer diameter greater than an outer diameter of the second cylindrical portion and an outer diameter of the third cylindrical portion,
wherein the bottom wall of the inner portion has a first mounting hole in which the first cylindrical portion is received, and
wherein the horizontal mounting rib has a second mounting hole in which the second cylindrical portion is received.

2. The side sill according to claim 1, wherein the mounting hardware is riveted to the inner portion.

3. The side sill according to claim 2,
wherein the horizontal mounting rib is spaced apart from a bottom wall of the inner portion.

4. The side sill according to claim 1, wherein the bottom wall of the inner portion is thicker than a remaining portion of the inner portion.

5. The side sill according to claim 1, wherein the second cylindrical portion is deformed outwardly when an axial force is applied to the mounting hardware.

6. The side sill according to claim 1, wherein, when an axial force is applied to the mounting hardware, the second cylindrical portion is expanded or bulged outwardly so that the second cylindrical portion is deformed into a bulged portion,
wherein the bulged portion has an outer diameter greater than a diameter of the second mounting hole,
wherein the horizontal mounting rib presses the bulged portion upwardly, and
wherein the head portion presses the bottom wall upwardly.

7. The side sill according to claim 5, wherein the second cylindrical portion is thinner than the first cylindrical portion and the third cylindrical portion.

8. The side sill according to claim 5, wherein the second cylindrical portion has a plurality of grooves extending longitudinally in an outer surface thereof.

9. The side sill according to claim 1, wherein the third cylindrical portion has an internal thread on an inner surface thereof.

10. The side sill according to claim 1, further comprising a reinforcing rib, which is orthogonal to the horizontal mounting rib,
   wherein the reinforcing rib extends from the bottom wall of the inner portion to a top wall of the inner portion.

11. The side sill according to claim 1, wherein the head portion has a plurality of projections, and wherein each projection has a sharp edge on a top end thereof.

\* \* \* \* \*